(12) United States Patent
Daian

(10) Patent No.: US 9,516,320 B2
(45) Date of Patent: Dec. 6, 2016

(54) METHOD OF GENERATING IMAGE DATA

(75) Inventor: Hideki Daian, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 1704 days.

(21) Appl. No.: 12/753,356

(22) Filed: Apr. 2, 2010

(65) Prior Publication Data

US 2010/0278266 A1  Nov. 4, 2010

(30) Foreign Application Priority Data

Apr. 30, 2009 (JP) ................. 2009-110850

(51) Int. Cl.
| | | |
|---|---|---|
| H04N 19/176 | (2014.01) | |
| H04N 19/11 | (2014.01) | |
| H04N 19/147 | (2014.01) | |
| H04N 19/593 | (2014.01) | |
| H04N 19/192 | (2014.01) | |
| H04N 19/196 | (2014.01) | |

(52) U.S. Cl.
CPC ............ *H04N 19/11* (2014.11); *H04N 19/147* (2014.11); *H04N 19/176* (2014.11); *H04N 19/192* (2014.11); *H04N 19/593* (2014.11)

(58) Field of Classification Search
USPC ........................................ 375/240.12, 240.15
See application file for complete search history.

(56) References Cited

U.S. PATENT DOCUMENTS

| | | | | |
|---|---|---|---|---|
| 2005/0089235 A1* | 4/2005 | Sakaguchi | ............ | H04N 19/176 382/239 |
| 2006/0039471 A1* | 2/2006 | Dane et al. | ............... | 375/240.16 |
| 2010/0020872 A1* | 1/2010 | Shimizu | ............... | H04N 19/196 375/240.12 |
| 2010/0118945 A1* | 5/2010 | Wada | ................... | H04N 19/176 375/240.12 |
| 2010/0195722 A1* | 8/2010 | Boon | ............... | H04N 19/00042 375/240.12 |

FOREIGN PATENT DOCUMENTS

| | | | |
|---|---|---|---|
| JP | 2004-140473 A | 5/2004 | |
| JP | 2005-151017 A | 6/2005 | |
| JP | 2005-176073 A | 6/2005 | |
| JP | 2006-5438 A | 1/2006 | |
| JP | 2006-237765 A | 9/2006 | |
| JP | 2007-13298 A | 1/2007 | |
| JP | 2007-53561 A | 3/2007 | |
| JP | 2007-251923 A | 9/2007 | |

(Continued)

OTHER PUBLICATIONS

Office Action issued Nov. 20, 2012 in Japanese Patent Application No. 2009-110850 (with partial English-language translation).

*Primary Examiner* — Obafemi Sosanya
(74) *Attorney, Agent, or Firm* — Oblon, McClelland, Maier & Neustadt, L.L.P.

(57) ABSTRACT

Search is performed on Intra 16 to obtain a prediction mode leading to a minimum cost, and the minimum cost in Intra 16 and a corresponding prediction mode are stored. Search is performed on Intra 8 to obtain a prediction mode leading to a minimum cost, and then a relationship of magnitude between the stored minimum cost in Intra 16 and the minimum cost in Intra 8 is judged. After that, the minimum cost in Intra 8 and a corresponding prediction mode are stored, and search is performed on Intra 4 to obtain a prediction mode leading to a minimum cost. A relationship of magnitude between cost_intra and the minimum cost in Intra 4 is judged, and Intra 4 is determined as an optimum prediction mode in a case where Intra 4 is smaller.

6 Claims, 18 Drawing Sheets

(56) References Cited

FOREIGN PATENT DOCUMENTS

| JP | 2007-282014 | 10/2007 |
| JP | 2009-17534 A | 1/2009 |
| JP | 2009-21927 A | 1/2009 |
| JP | 2009-60153 A | 3/2009 |
| JP | 2009-290498 A | 12/2009 |
| WO | WO 2008/120577 A1 | 10/2008 |

* cited by examiner

PREDICTION MODE 3

FIG. 17
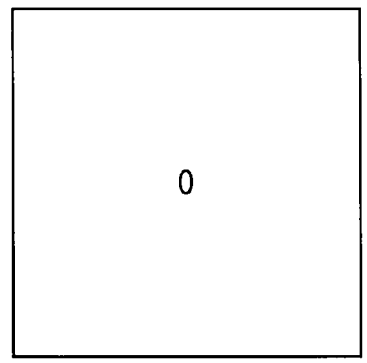
FIG. 18
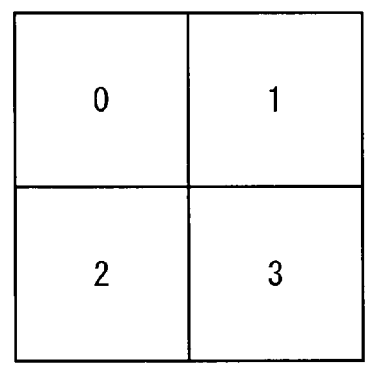
FIG. 19
| Intra4 (4×4) | | | |
|---|---|---|---|
| 0 | 1 | 4 | 5 |
| 2 | 3 | 6 | 7 |
| 8 | 9 | 12 | 13 |
| 10 | 11 | 14 | 15 |

F I G . 2 0

(MODE (N) : N=4, 8, 16)

| SEARCH TARGET MODE IN MODE (16) | |
|---|---|
| 0, 1, 2, 3 | |
| SEARCH RESULT OF Intra 16 | SEARCH TARGET MODE IN MODE (8) |
| 0 | 3, 7, 0, 5, 4 |
| 1 | 4, 6, 1, 8 |
| 2, 3 | 0, 1, 2 |
| SEARCH RESULT OF Intra 8 | SEARCH TARGET MODE IN MODE (4) |
| 0 | 7, 0, 5 |
| 1 | 6, 1, 8 |
| 2 | 0, 1, 2 |
| 3 | 3, 7, 0 |
| 4 | 5, 4, 6 |
| 5 | 0, 5, 4 |
| 6 | 4, 6, 1 |
| 7 | 3, 7, 0 |
| 8 | 6, 1, 8 |

F I G . 2 7

| SEARCH RESULT OF Intra 16 | OPTIMUM MODE OF Intra CHROMA |
|---|---|
| 0 | 2 |
| 1 | 1 |
| 2 | 0 |
| 3 | 3 |

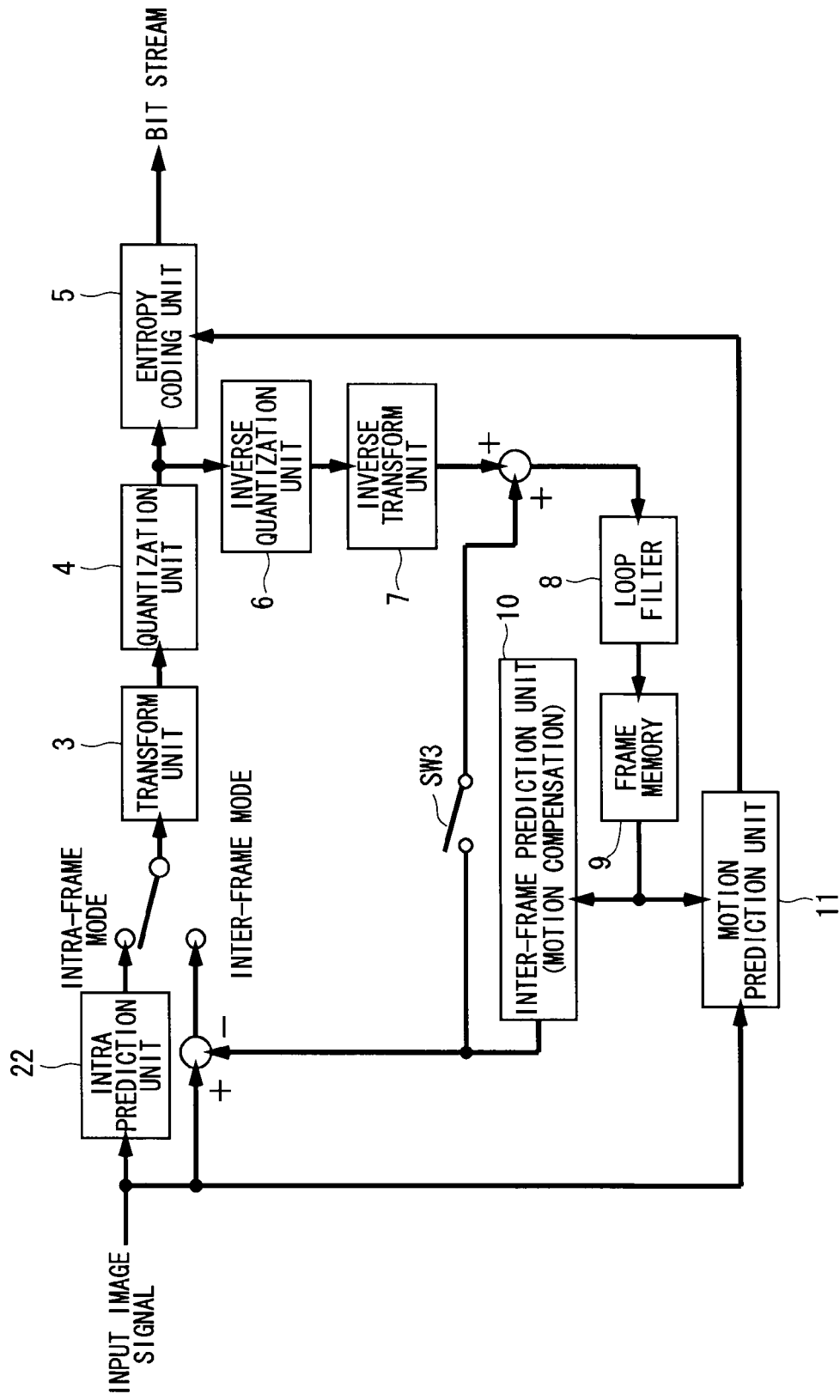

METHOD OF GENERATING IMAGE DATA

BACKGROUND OF THE INVENTION

1. Field of the Invention

The present invention relates to a method of generating image data, and more particularly, to a method of generating image data including intra prediction for determining a prediction mode with ease.

2. Description of the Background Art

As the latest international standard for moving picture encoding, the Video Coding Experts Group (VCEG) of the International Telecommunication Union-Telecommunication Standardization Sector (ITU-T) and the Moving Picture Experts Group (MPEG) of ISO/IEC, which are international organizations for standardization dealing with telecommunication, have developed H.264 to be put to practical use.

H.264 is capable of performing compression twice volume as much as MPEG-2 and MPEG-4 while maintaining the same level of image quality, and thus is applicable to a wide range of use from a low bit-rate teleconference to a high definition television (HDTV).

One of the characteristics of H.264 is a mode referred to as intra-frame prediction (intra prediction). This is a mode for improving a compressibility with the use of pixel correlation, in which a prediction image is generated through interpolation of data between subblocks, and encoded subblocks adjacent to an encoding target subblock are referred to, to thereby perform prediction by comparison at a pixel level.

Intra prediction is adopted also in MPEG-4, in which left, upper and upper-left subblocks are referred to. On the other hand, left, upper, upper-left and upper-right subblocks are referred to in H.264, whereby a prediction image with a higher degree of accuracy is obtained.

Prediction is performed in 8 by 8 pixels in MPEG-4, whereas in H.264, a complicated image is predicted in 4 by 4 pixels, and a simple image is predicted in 8 by 8 pixels and 16 by 16 pixels, which enables efficient prediction.

In H.264 intra prediction as described above, an optimum prediction mode is determined by four patterns of prediction methods (prediction modes) in a case of prediction in 16 by 16 pixels, and by nine patterns of prediction modes in cases of prediction in 8 by 8 pixels and prediction in 4 by 4 pixels, which requires an enormous amount of computing, leading to a problem that it takes long time before prediction results are obtained.

Japanese Patent Application Laid-Open No. 2007-282014 discloses the technology of using simplified intra prediction in which a pixel value prior to encoding is also used as a prediction value for performing intra prediction and normal intra prediction in combination, so that high efficiency is achieved in intra prediction to reduce time required for intra prediction. However, much higher efficiency is required as a display apparatus becomes larger.

SUMMARY OF THE INVENTION

An object of the present invention is to provide a method of generating image data in which intra prediction of individual subblock is performed efficiently to reduce time required for intra prediction.

A first aspect of a method of generating image data according to the present invention relates to a method of generating image data for performing image prediction subblock by subblock, the subblock being obtained by segmenting a macroblock in a predetermined encoding size, the image prediction being executed by a plurality of prediction methods defined by a size of the subblock, which includes: a first step of performing interpolation on a pixel of a second subblock serving as an encoding target in a plurality of prediction modes, using a pixel value of a first subblock serving as a reference target; and a second step of obtaining a cost defined by a sum of absolute difference between a pixel value of a first prediction image of the second subblock obtained by the interpolation and a pixel value of the second subblock prior to execution interpolation, for each of the plurality of prediction modes, to thereby determine a minimum cost among the obtained costs, wherein the first and second steps are executed from the prediction method in which the encoding size is larger to obtain a first prediction mode leading to a first minimum cost, the first and second steps are executed, by using a prediction mode to be used in the following prediction method set in advance for the first prediction mode, in the following prediction method to determine a second minimum cost, and the first and second minimum costs are compared with each other to determine an optimum prediction mode through an operation of selecting the smaller minimum cost.

According to the first aspect of the method of generating image data of the present invention, the first and second steps are performed from the prediction method in which the encoding size is larger to obtain the first prediction mode leading to the first minimum cost, the first and second steps are performed, by using the prediction mode to be used in the following prediction method set in advance for the first prediction mode, in the following prediction method to determine the second minimum cost, and the first and second minimum costs are compared with each other to determine the optimum prediction mode through the operation of selecting the smaller minimum cost. Accordingly, it is possible to significantly reduce the number of times cost calculation is performed in deriving the optimum prediction mode.

In a second aspect of the method of generating image data according to the present invention, in the case where the first minimum cost is judged to be smaller in the comparison between the first and second minimum costs, the operation of calculating the minimum cost in the prediction method in which the encoding size is smaller is skipped to determine the first prediction mode leading to the first minimum cost as the optimum prediction mode.

According to the second aspect of the method of generating image data of the present invention, the number of times cost calculation is performed is reduced further by the skip processing.

In a third aspect of the method of generating image data according to the present invention, the macroblock consists of 16 by 16 pixels; and in the plurality of prediction methods, the image prediction of the macroblock is performed in subblocks of 16 by 16 pixels, 8 by 8 pixels, and 4 by 4 pixels.

According to the third aspect of the method of generating image data of the present invention, it is possible to be adaptable to a realistic prediction method used in H.264.

In a fourth aspect of the method of generating image data according to the present invention, the first subblock is a subblock whose encoding is yet to be finished; the image prediction corresponds to simplified intra prediction for performing interpolation on the pixel of the second subblock using the pixel value of the first subblock prior to encoding; and the optimum prediction mode determined in the simplified intra prediction is used to perform intra prediction.

According to the fourth aspect of the method of generating image data of the present invention, the present invention is applied to the simplified intra prediction, and thus the image prediction can be started at a stage at which encoding of an immediately preceding subblock has not been finished. Accordingly, time required for intra prediction is reduced, which enables efficient intra prediction.

In a fifth aspect of the method of generating image data according to the present invention, the simplified intra prediction and the intra prediction are executed by a pipeline processing; and the pipeline processing includes, in a number n processing cycle in which the simplified intra prediction is executed on a number n subblock, performing the intra prediction on a number n−1 subblock subjected to the simplified intra prediction in a number n−1 processing cycle, and executing local decoding on the number n−1 subblock using the optimum prediction mode determined by the simplified intra prediction.

According to the fifth aspect of the method of generating image data of the present invention, simplified intra prediction and intra prediction are performed by the pipeline processing, which enables efficient encoding processing for image data.

In a sixth aspect of the method of generating image data according to the present invention, the first subblock is an encoded subblock; and the image prediction corresponds to intra prediction for performing interpolation on the pixel of the second subblock using a pixel value of the encoded subblock.

According to the sixth aspect of the method of generating image data of the present invention, the application of the present invention to intra prediction significantly reduces the number of times cost calculation is performed in deriving the optimum prediction mode. In addition, the reference target pixels are all encoded in intra prediction, which enables prediction with high accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 shows a configuration example of a subblock in the case where intra prediction is performed in 16 by 16 pixels;
FIG. 18 shows a configuration example of a subblock in a case where intra prediction is performed in 8 by 8 pixels;
FIG. 19 shows a configuration example of a subblock in the case where intra prediction is performed in 4 by 4 pixels;
FIG. 20 shows an example of prediction modes which are targets of cost calculation for respective search results;
FIG. 27 shows an example of an encoding mode of Intra chroma, which is associated with a search result of Intra 16;
and
FIG. 28 is a block diagram showing a configuration of an H.264 encoder including an intra prediction unit.

DESCRIPTION OF THE PREFERRED EMBODIMENTS (As to Intra Prediction Mode)

Prior to description of preferred embodiments of the present invention, description will be given of nine patterns of prediction modes used for prediction in 4 by 4 pixels in H.264 intra prediction.

Figure 1:
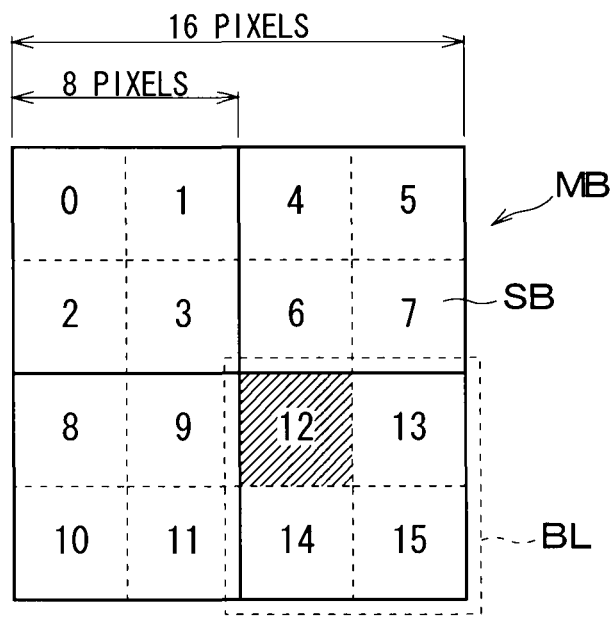
FIG. 1 schematically shows a macroblock consisting of 16 by 16 pixels.

FIG. 1 schematically shows a macroblock MB consisting of 16 by 16 pixels, in which the macroblock MB consists of 16 subblocks SB.

Each of the subblocks SB consists of 4 by 4 pixels, and intra prediction and encoding are performed subblock by subblock. In FIG. 1, numbers assigned to the respective subblocks SB represent an order of encoding, which are assigned in a zigzag manner such that a subblock in the upper-left corner is 0, a subblock immediate right thereof is 1, and a subblock below 0 is 2.

Further, four subblocks SB constitute a block BL in 8 by 8 pixels, and number 0 to 3 subblocks, number 4 to 7 subblocks, number 8 to 11 subblocks, and number 12 to 15 subblocks each constitute one block BL.

Hereinbelow, with the assumption that intra prediction is performed on the number 12 subblock SB, nine patterns of prediction modes will be described with reference to FIG. 2 to FIG. 11.

Figure 2:
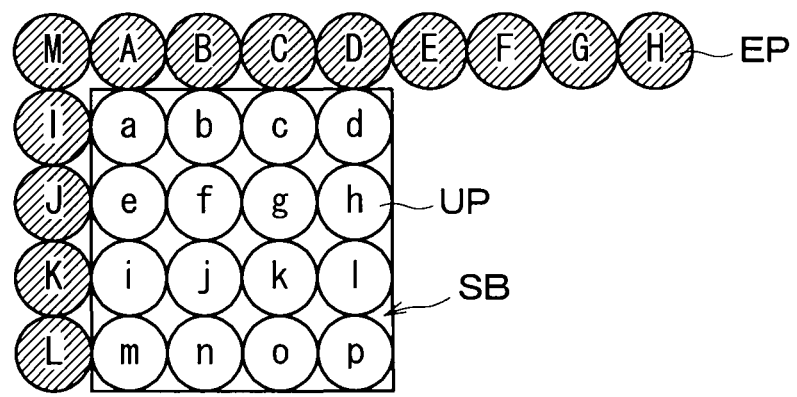
FIG. 2 schematically shows sixteen encoding target pixels which constitute a subblock and reference pixels used in intra prediction.

FIG. 2 shows sixteen encoding target pixels UP constituting the above-mentioned number 12 subblock SB, and encoded pixels EP in the encoded subblock which are adjacent to the number 12 subblock SB. Among the encoded pixels EP, the pixels which are used as reference pixels in intra prediction are assigned symbols A to M for the sake of convenience. Further, sixteen encoding target pixels UP are individually assigned symbols a to p for the sake of convenience such that the pixel in the upper-left corner is a, the one immediately right thereof is b, and ones right thereof are assigned c and d in series, and that the pixel below the pixel a is assigned e. In this manner, symbols are assigned up to p in accordance with a similar rule.

That is, the encoded pixels EP in the number 6 subblock SB (upper block) shown in FIG. 1 are assigned symbols A to D in order from the left, the encoded pixels EP in the number 7 subblock SB (upper-right block) are assigned symbols E to H in order from the left, the encoded pixels EP in the number 9 subblock SB (left block) are assigned symbols I to L in order from the top, and the encoded pixel EP in the number 3 subblock SB (upper-left block) is assigned M.

Figure 3:
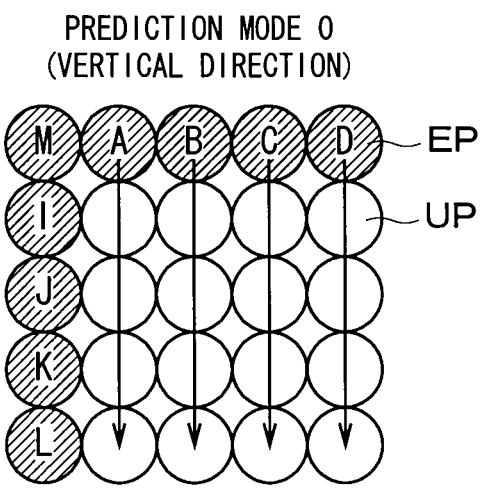
FIG. 3 schematically shows a prediction mode 0 in a case where intra prediction is performed in 4 by 4 pixels.

FIG. 3 schematically shows a prediction method which is referred to as a prediction mode 0, and as indicated by arrows, respective pixel values of the number A to D encoded pixels EP are used as prediction values of encoding target values UP present in directions vertical to the respective number A to D encoded pixels EP to perform interpolation, thereby obtaining a prediction image. Note that whether or not the prediction image is appropriate is judged from a magnitude of a cost which is obtained by calculating differences with the encoding target pixels UP, and calculating a sum of absolute difference (SAD) thereof. Note that calculation for calculating a cost in each prediction mode is referred to as cost calculation, and in a case where a cost is calculated in one prediction mode for one subblock, it is defined that one cost calculation is performed.

Figure 4:
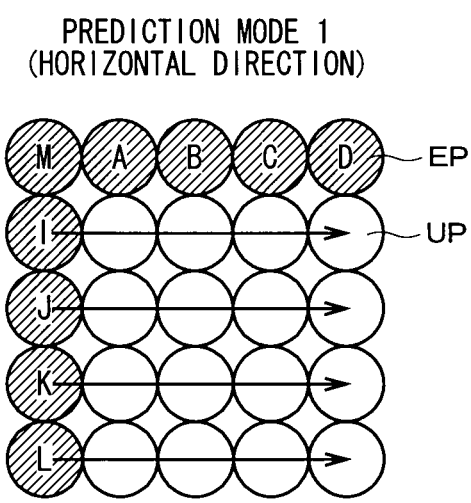
FIG. 4 schematically shows a prediction mode 1 in the case where intra prediction is performed in 4 by 4 pixels.

FIG. 4 schematically shows a prediction method referred to as a prediction mode 1, and as indicated by arrows, the respective pixel values of the number I to L encoded pixels EP are used as prediction values for the encoding target pixels UP present in directions horizontal to the respective number I to L encoded pixels EP to perform interpolation, thereby obtaining a prediction image. Note that whether or not the prediction image is appropriate is judged from a magnitude of the SAD obtained by calculating differences with the original pixel values of the encoding target pixels UP.

Figure 5:
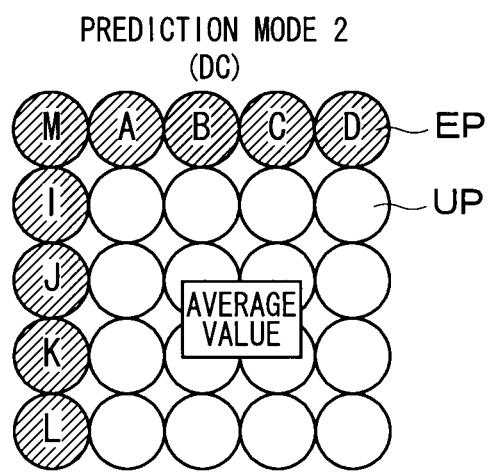
FIG. 5 schematically shows a prediction mode 2 in the case where intra prediction is performed in 4 by 4 pixels.

FIG. 5 schematically shows a prediction method referred to as a prediction mode 2, in which an average value of the respective pixel values of the number A to D and I to L encoded pixels EP are used as a prediction value for all encoding target pixels UP to perform interpolation, thereby obtaining a prediction image, which is also referred to as a direct current (DC) mode. Note that whether or not the prediction image is appropriate is judged from a magnitude of the SAD obtained by calculating differences with the original pixel values of the encoding target pixels UP.

Figure 6:
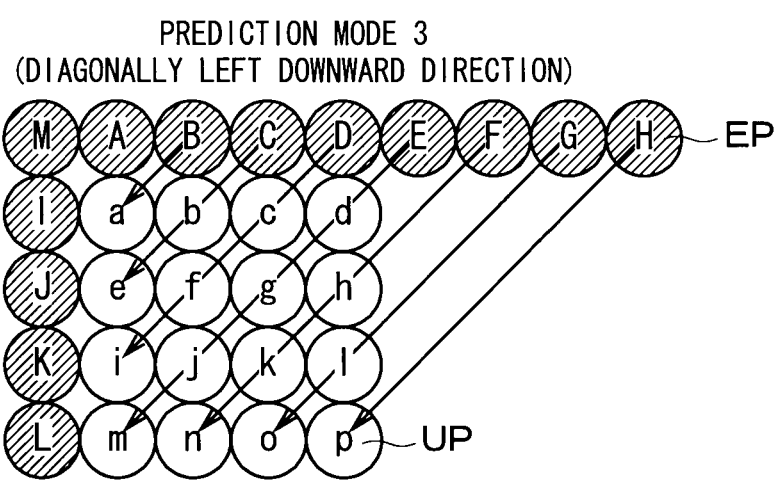
FIG. 6 schematically shows a prediction mode 3 in the case where intra prediction is performed in 4 by 4 pixels.

FIG. 6 schematically shows a prediction method referred to as a prediction mode 3, and as indicated by arrows, the respective pixel values of the number A to H encoded pixels EP are used as prediction values for the encoding target pixels UP present at positions in a diagonally down leftward direction of the number A to H encoded pixels EP to perform interpolation, thereby obtaining a prediction image. Note that whether or not the prediction image is appropriate is judged from a magnitude of the SAD obtained by calculating differences with the original pixel values of the encoding target pixels UP.

Figure 7:
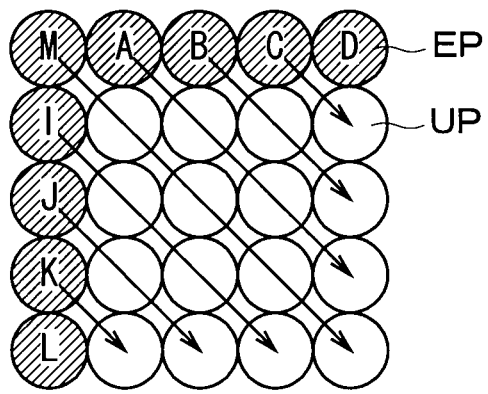
FIG. 7 schematically shows a prediction mode 4 in the case where intra prediction is performed in 4 by 4 pixels.

FIG. 7 schematically shows a prediction method referred to as a prediction mode 4, and as indicated by arrows, the respective pixel values of the number A to D, M, and I to L encoded pixels EP are used as prediction values for the encoding target pixels UP present at positions in a diagonally right downward direction of the number A to D, M, and I to L encoded pixels EP to perform interpolation, thereby obtaining a prediction image. Note that whether or not the prediction image is appropriate is judged from a magnitude of the SAD obtained by calculating differences with the original pixel values of the encoding target pixels UP.

Figure 8:
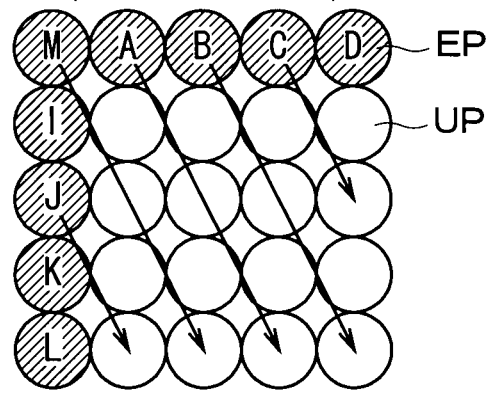
FIG. 8 schematically shows a prediction mode 5 in the case where intra prediction is performed in 4 by 4 pixels.

FIG. 8 schematically shows a prediction method referred to as a prediction mode 5, and as indicated by arrows, the respective pixel values of the number A to D, M, and I to L encoded pixels EP are used prediction values for the encoding target pixels UP present at positions on the right side with respect to the vertical direction of the number A to D, M, and I to L encoded pixels EP to perform interpolation, thereby obtaining a prediction image. Note that whether or not the prediction image is appropriate is judged from a size of the SAD obtained by calculating differences with the original pixel values of the encoding target pixels UP.

Figure 9:
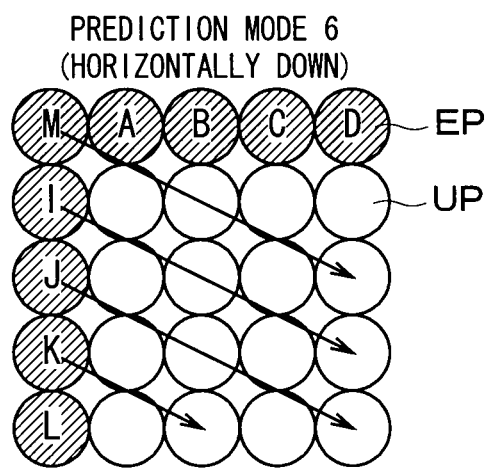
FIG. 9 schematically shows a prediction mode 6 in the case where intra prediction is performed in 4 by 4 pixels.

FIG. 9 schematically shows a prediction method referred to as a prediction mode 6, and as indicated by arrows, the respective pixel values of the number A to D, M, and I to L encoded pixels EP are used as prediction values for the encoding target pixels UP present at positions downward with respect to the horizontal directions of the respective number A to D, M, and I to L encoded pixels EP to perform interpolation, thereby obtaining a prediction image. Note that whether or not the prediction image is appropriate is judged from a magnitude of the SAD obtained by calculating differences with the original pixel values of the encoding target pixels UP.

Figure 10:
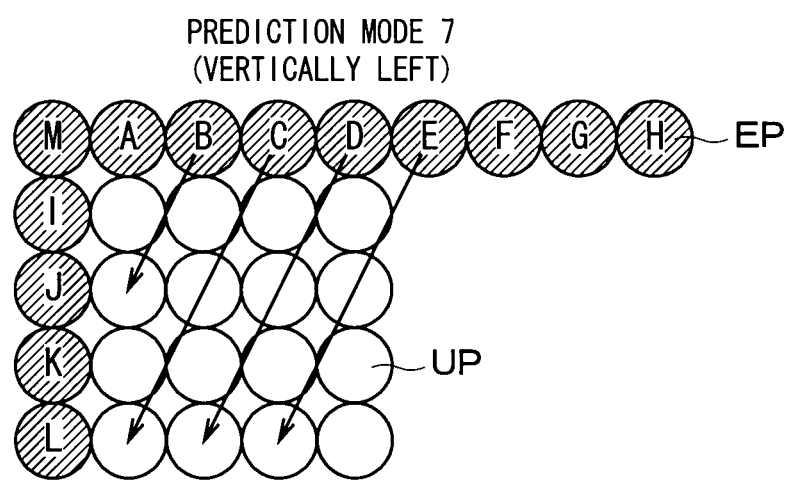
FIG. 10 schematically shows a prediction mode 7 in the case where intra prediction is performed in 4 by 4 pixels.

FIG. 10 schematically shows a prediction method referred to as a prediction mode 7, and as indicated by arrows, the respective pixel values of the number A to G encoded pixels EP are used as prediction values for the encoding target pixels UP present at positions leftward with respect to the vertical directions of the number A to G encoded pixels EP to perform interpolation, thereby obtaining a prediction image. Note that whether or not the prediction image is appropriate is judged from a magnitude of the SAD obtained by calculating differences with the original pixel values of the encoding target pixels UP.

Figure 11:
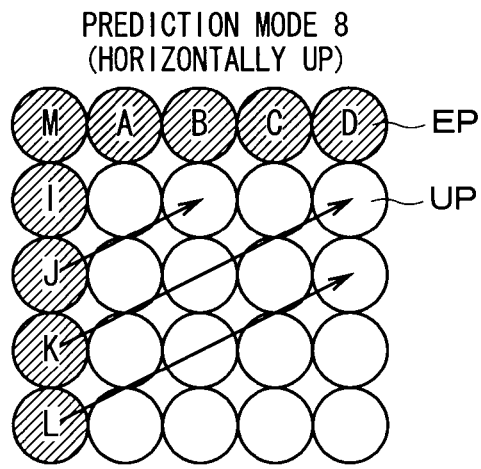
FIG. 11 schematically shows a prediction mode 8 in the case where intra prediction is performed in 4 by 4 pixels.

FIG. 11 schematically shows a prediction method referred to as a prediction mode 8, and as indicated by arrows, the respective pixel values of the number I to L encoded pixels EP are used as prediction values for the encoding target pixels UP present at positions upward with respect to the horizontal directions of the number I to L encoded pixels EP to perform interpolation, thereby obtaining a prediction image. Note that whether or not the prediction image is appropriate is judged from a magnitude of the SAD obtained by calculating differences with the original pixel values of the encoding target pixels UP.

In a macroblock consisting of 16 by 16 pixels, four patterns of prediction modes are used in a case where intra prediction is performed in 16 by 16 pixels. Those four patterns will be described with reference to FIG. 12 to FIG. 15.

Note that in FIG. 12 to FIG. 15, pixels used as reference pixels in intra prediction among the encoded pixels EP of adjacent macroblocks are assigned symbols A to P and a to q for the sake of convenience. That is, the encoded pixels EP in the adjacent macroblock above are assigned A to P in order from the left, the encoded pixels EP in the adjacent macroblock on the left side are assigned a to p in order from the top, and the encoded pixel EP in the adjacent macroblock obliquely left upward is assigned q.

Figure 12:
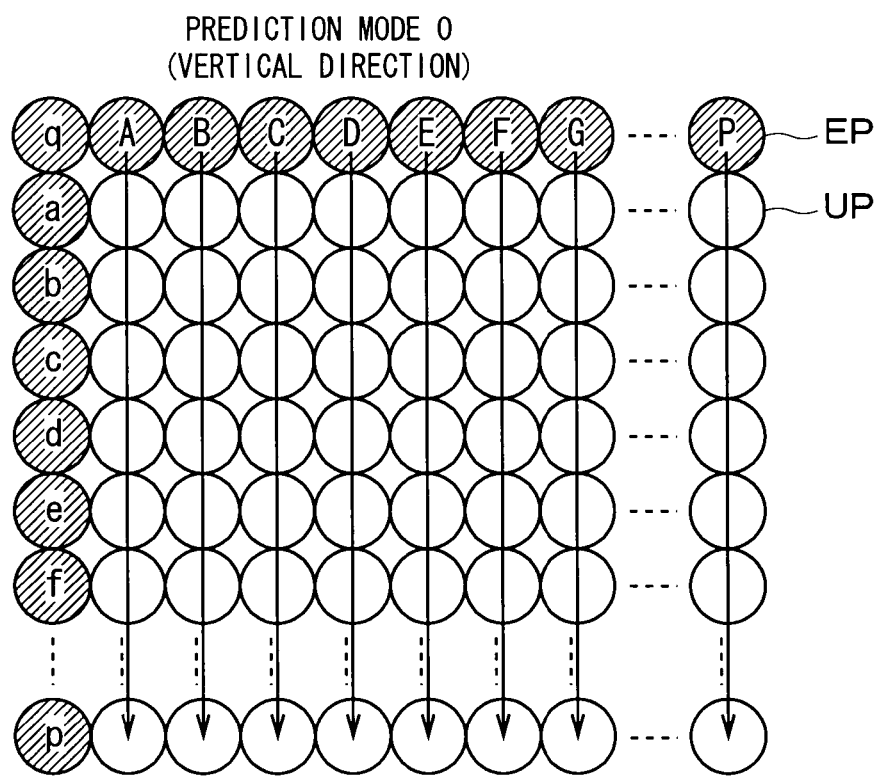
FIG. 12 schematically shows the prediction mode 0 in a case where intra prediction is performed in 16 by 16 pixels.

FIG. 12 schematically shows the prediction method referred to as the prediction mode 0, and as indicated by arrows, the respective pixel values of the number A to P encoded pixels EP are used as prediction values for the encoding target pixels UP present in directions vertical to the number A to P encoded pixels EP to perform interpolation, thereby obtaining a prediction image.

Figure 13:
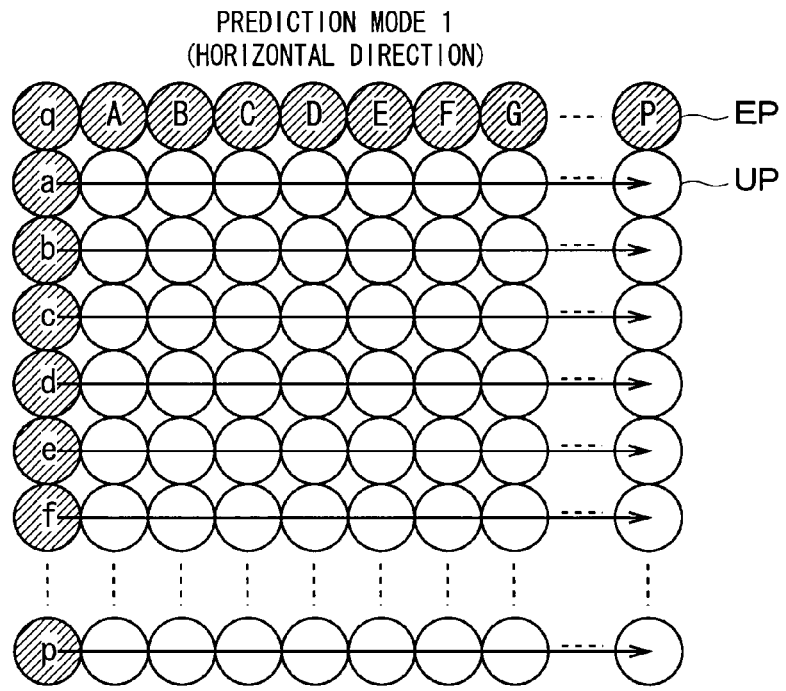
FIG. 13 schematically shows the prediction mode 1 in the case where intra prediction is performed in 16 by 16 pixels.

FIG. 13 schematically shows the prediction method referred to as the prediction mode 1, and as indicated by arrows, the respective pixel values of the number a to p encoded pixels EP are used as prediction values for the encoding target pixels UP present in horizontal directions to the number a to p encoded pixels EP to perform interpolation, thereby obtaining a prediction image.

Figure 14:
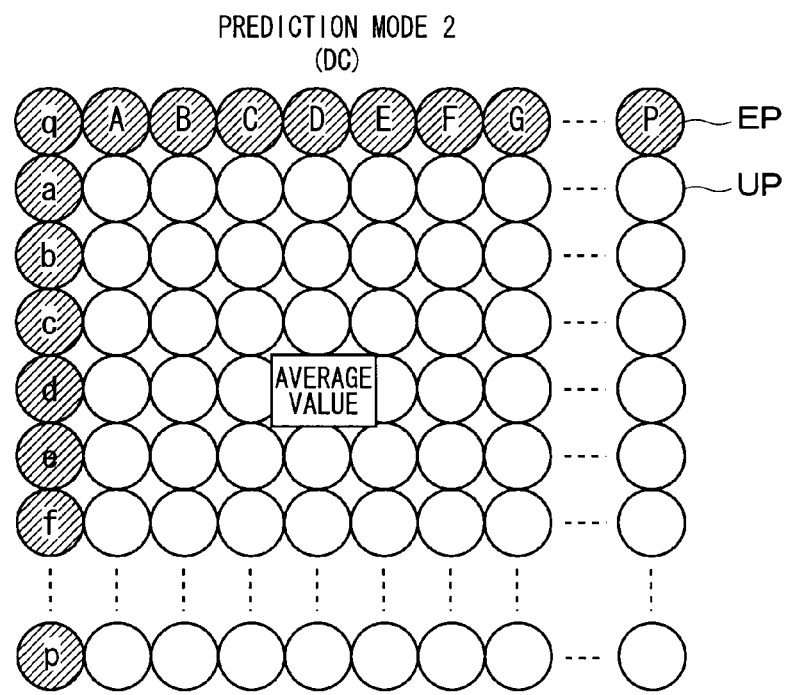
FIG. 14 schematically shows the prediction mode 2 in the case where intra prediction is performed in 16 by 16 pixels.

FIG. 14 schematically shows the prediction method referred to as the prediction mode 2, and an average value of the respective pixel values of the number A to P and a to p encoded pixels EP is used as a prediction value for all of the encoding target pixels UP to perform interpolation, thereby obtaining a prediction image. This is also referred to as a DC mode.

Figure 15:
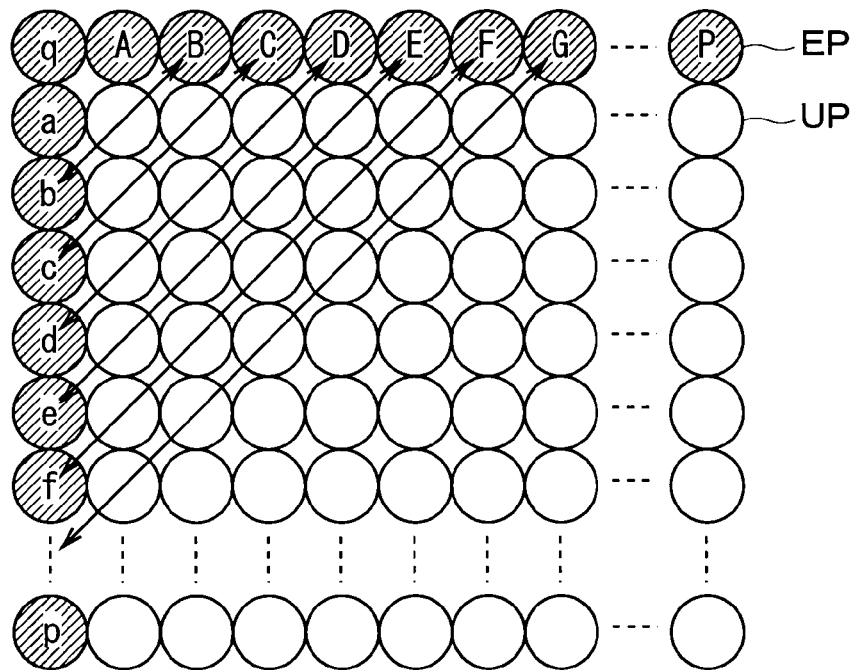
FIG. 15 schematically shows the prediction mode 3 in the case where intra prediction is performed in 16 by 16 pixels.

FIG. 15 schematically shows the prediction method referred to as the prediction mode 3, and as indicated by arrows, among the number A to P, q and a to p encoded pixels EP, pixels corresponding to each other in an oblique direction is made one pair. Then, pixel values of the pair of pixels are used as prediction values for the encoding target pixels UP sandwiched therebetween to perform interpolation, thereby obtaining a prediction image. This is also referred to as plane prediction.

Note that in a case where intra prediction is performed in 8 by 8 pixels in the macroblock consisting of 16 by 16 pixels, the prediction modes 0 to 8 are used as in the case of performing intra prediction in 4 by 4 pixels.

Figure 16:
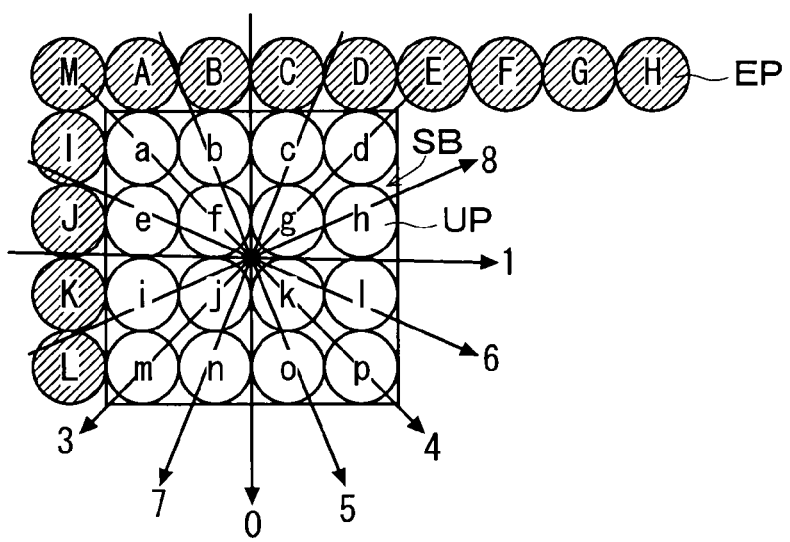
FIG. 16 schematically shows prediction directions in the case where intra prediction is performed in 4 by 4 pixels.

FIG. 16 schematically shows prediction directions by arrows in the case where intra prediction is performed in 4 by 4 pixels. Note that numbering of pixels used as reference pixels in the intra prediction and numbering of 16 encoding target pixels are similar to those of FIG. 2.

In FIG. 16, numbers of the respective prediction modes are shown in association with arrows indicating prediction directions, in which directions of the prediction modes 5, 4, 6, 1 and 8 are shown counterclockwise and directions of the prediction modes 7 and 3 are shown clockwise with the prediction mode 0 where prediction is performed in a vertical direction being a center. Note that the prediction direction of the prediction mode 2 cannot be specified and a prediction value thereof is calculated from (A+B+C+D+I+J+K+L)/8.

FIG. 17 to FIG. 19 show configuration examples of subblocks in cases where intra prediction is performed on a macroblock consisting of 16×16 pixels in 16×16 pixels, 8×8 pixels and 4×4 pixels, respectively, each of which are referred to as Intra 16, Intra 8 and Intra 4.

In Intra 16 shown in FIG. 17, there is no subblock, and there is a single number 0 block. In Intra 8 shown in FIG. 18, there are four number 0 to 3 subblocks, and there are sixteen number 0 to 15 subblocks in Intra 4 shown in FIG. 19.

(As to Technical Idea of the Present Invention)

Next, the technical idea of the present invention will be described.

In H.264, prediction is performed on a complicated image in 4×4 pixels, whereas prediction is performed on a simple image in 16×16 pixels, which improves encoding efficiency. The above-mentioned selection leads to determination of an optimum size through comparison using cost calculation.

The following equation (1) represents the required number of times cost calculation is performed for selecting an optimum prediction mode among all prediction methods of Intra 16, Intra 8 and Intra 4.

$$\frac{1(\text{block}) \times 4(\text{mode})}{(\text{Intra } 16)} + \frac{4(\text{block}) \times 9(\text{mode})}{(\text{Intra } 8)} + \frac{16(\text{block}) \times 9(\text{mode})}{(\text{Intra } 4)} = 184 \Lambda \quad (1)$$

That is, cost calculation is performed on the number 0 block (see FIG. 17) using four patterns of prediction modes in Intra 16, cost calculation is performed on the number 0 to 3 blocks (see FIG. 18) using nine patterns of prediction modes in Intra 8, and cost calculation is performed on the number 0 to 15 blocks (see FIG. 19) using nine patterns of prediction modes in Intra 4, which means that cost calculation needs to be performed 184 times in total.

In intra prediction, as described below, processings such as transform, quantization, inverse quantization and inverse transform are required to be performed sequentially to create an encoded image, and then the generated image needs to be used as a reference pixel. This requires a vast amount of time for performing cost calculation only in one mode.

The present invention is based on the technical idea that the number of times cost calculation is performed is significantly reduced by performing cost calculation in order from the prediction method of a larger encoding size to select a prediction mode in the following prediction method based on a result thereof, not by using all prediction modes in the respective prediction methods.

That is, in Intra 8, a target prediction mode in which cost calculation is performed is limited in advance, as a result of the cost calculation performed in Intra 16, for each prediction mode which leads to a minimum value, and in Intra 4, a target prediction mode in which cost calculation is performed is limited in advance, as a result of the cost calculation performed in Intra 8, for each prediction mode which leads to a minimum cost. Accordingly, the number of times cost calculation is performed is reduced.

Here, when it is assumed that an operation for obtaining a prediction mode which leads to a minimum cost in each of the prediction methods is referred to as search, a set of prediction target modes in search in Intra 16 is referred to as MODE (16), a set of search target modes in search in Intra 8 is referred to as MODE (8), and a set of search target modes in search in Intra 4 is referred to as MODE (4), an example of the search target modes in which cost calculation is performed for each search result is shown as in FIG. 20.

As shown in FIG. 20, the search target modes of Intra 16 are all of the prediction modes 0 to 3 because Intra 16 is the most significant (which means that search is performed first).

Then, in a case where a result of the search in Intra 16 reveals that the prediction mode 0 leads to a minimum cost, the search target modes in Intra 8 are the prediction modes 3, 7, 0, 5 and 4. As shown in FIG. 16, those modes expand on both sides of the prediction mode 0 being the center thereof, which are set in this manner such that the mode leading to a minimum cost is found efficiently by intensively searching the neighboring modes of the prediction mode 0 because the search result in Intra 16 is the prediction mode 0.

In a case where the result in Intra 16 reveals that the prediction mode 1 leads to a minimum cost, the search target modes in Intra 8 are the prediction modes 4, 6, 1 and 8. As shown in FIG. 16, those modes expand on both sides of the prediction mode 1 being the center thereof, which are set in this manner such that the mode leading to a minimum cost is found efficiently by intensively searching the neighboring modes of the prediction mode 1 because the search result in Intra 16 is the prediction mode 1.

In a case where the result in Intra 16 reveals that the prediction mode 2 or 3 leads to a minimum cost, the search target modes in Intra 8 are the prediction modes 0, 1 and 2. In those modes, there is no specific directivity of an image in 16 by 16 pixels because the search result in Intra 16 is the prediction mode 2 or 3. Therefore, those modes are set in this manner such that directivity of an image is searched again in 8 by 8 pixels.

As described above, there is regularity in setting of the search target modes, which holds true for the search target modes in Intra 4.

FIG. 20 shows the search target modes in Intra 8 in the case where the search result in Intra 8 is any of the prediction modes 0 to 8, where three modes are set as the search targets for the search results in Intra 8.

Employment of the methods described above significantly reduces the required number of times cost calculation is performed for selecting an optimum prediction mode among all prediction methods of Intra 16, Intra 8 and Intra 4, as represented by the following equation (2).

$$\frac{1(\text{block}) \times 4(\text{mode})}{(\text{Intra } 16)} + \frac{4(\text{block}) \times 5(\text{mode})}{(\text{Intra } 8)} + \frac{16(\text{block}) \times 3(\text{mode})}{(\text{Intra } 4)} = 72\Lambda \quad (2)$$

That is, four patterns of prediction modes are used to perform cost calculation on the number 0 block (see FIG. 17) in Intra 16, a maximum of five patterns of prediction modes is used to perform cost calculation on each of the number 0 to 3 blocks (see FIG. 18) in Intra 8, and three patterns of prediction modes are used to perform cost calculation on each of the number 0 to 15 blocks (see FIG. 19) in Intra 4, which results in that cost calculation is performed only 72 times in total.

As a result, compared with 184 times where the present invention is not applied, 72/184=0.391, and hence a cost calculation amount is reduced by 60%.

Note that the number of setting of search target modes for each of the search results is merely an example, which is not limited thereto. For example, in a case where the search result in Intra 16 is the prediction mode 0, the search target modes in MODE (8) may include three, that is, the prediction modes 7, 0 and 5. Alternatively, in a case where the search result in Intra 16 is the prediction mode 1, the search target modes in MODE (8) may include three, that is, the prediction modes 6, 1 and 8.

It is possible to further reduce a cost calculation amount through reduction in the number of search target modes, and the number of search target modes may be determined in consideration of trade-off with image quality.

First Preferred Embodiment

Hereinbelow, a method of generating image data according to a first preferred embodiment of the present invention will be described with reference to FIG. 21 to FIG. 27.

In the first preferred embodiment, the present invention is applied to an H.264 encoder which uses simplified intra prediction and intra prediction in combination.

(Overall Configuration of Encoder and Flow of Operation)

Figure 21:
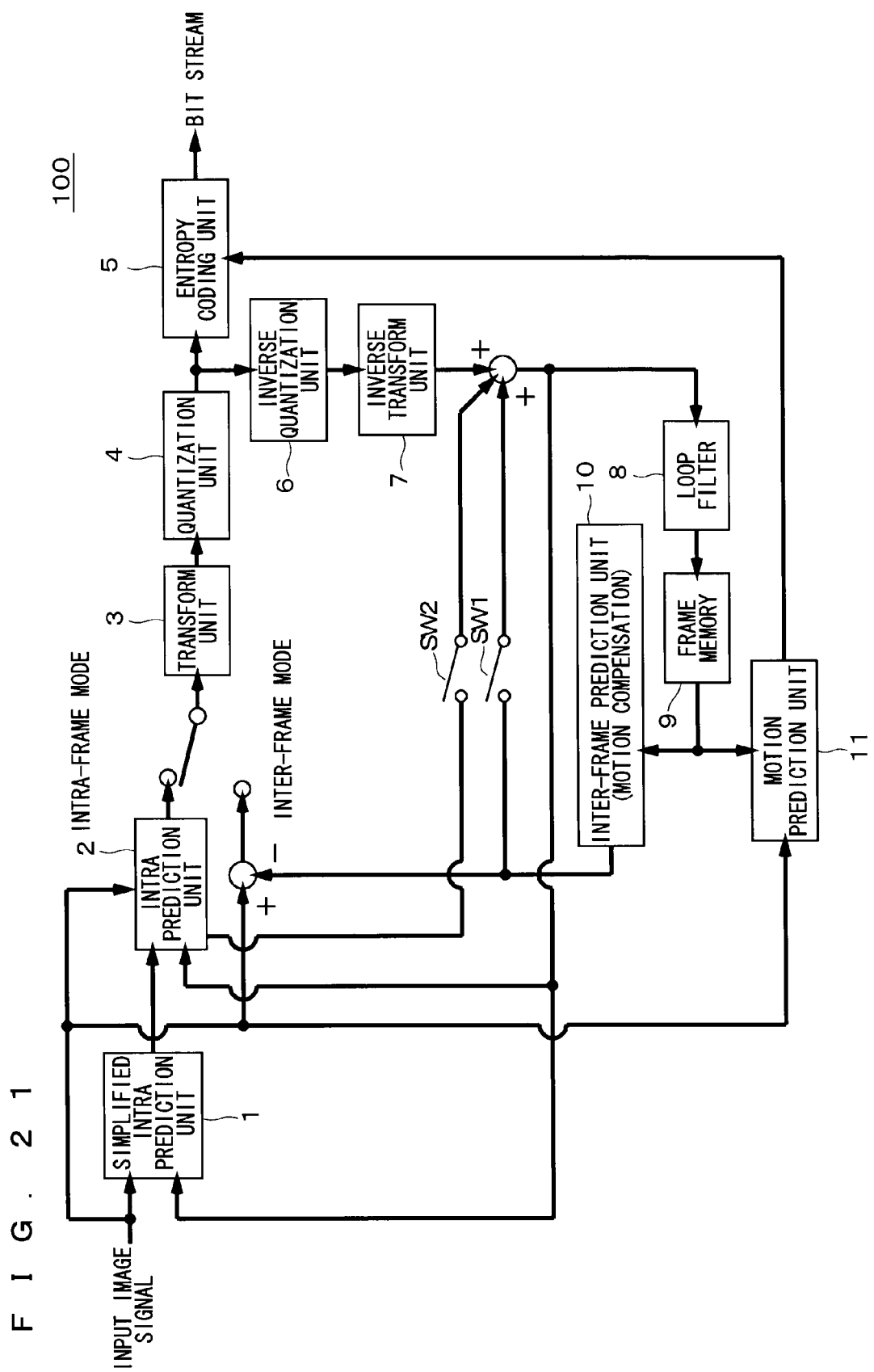
FIG. 21 is a block diagram showing a configuration of an H.264 encoder including a simplified intra prediction unit.

FIG. 21 is a block diagram showing a configuration of an H.264 encoder 100 which uses simplified intra prediction and intra prediction in combination.

As shown in FIG. 21, the encoder 100 includes a simplified intra prediction unit 1, an intra prediction unit 2, a transform unit 3, a quantization unit 4, an entropy coding unit 5, an inverse quantization unit 6, an inverse transform unit 7, a loop filter 8, a frame memory 9, an inter-frame prediction unit 10 and a motion prediction unit 11.

An input image signal input to the encoder 100 is supplied to the simplified intra prediction unit 1 and the motion prediction unit 11, and is also used for taking a difference with a prediction image output from the inter-frame prediction unit 10.

The simplified intra prediction unit 1 selects, among all prediction methods of Intra 16, Intra 8 and Intra 4, an optimum prediction mode by simplified intra prediction. In simplified intra prediction, not only the encoded pixel value of the subblock (first subblock) to be referred to but also a pixel value thereof before encoding is used as a prediction value (first prediction value) to perform a minimum of nine patterns of prediction modes, whereby a prediction image (first prediction image) in each prediction mode is obtained. At the same time, the SAD of differences with the pixel value of the encoding target pixel of the subblock (second subblock) to be encoded, that is, a cost is obtained.

In this case, in accordance with the technical idea of the present invention which has been previously described, cost calculation is performed in order from the prediction method of a larger encoding size, and a prediction mode in the following prediction method is selected based on a result thereof, whereby a prediction mode is narrowed down to select an optimum prediction mode.

The result of narrowing down a prediction mode by the simplified intra prediction unit 1 is supplied to the intra prediction unit 2 with the input image signal. Then, the intra prediction unit 2 performs normal intra prediction on the optimum prediction mode obtained through narrowing down, to thereby determine an optimum prediction mode.

Here, normal intra prediction refers to prediction using an encoded pixel value as a prediction value (second prediction value). At this stage, encoding of the immediately preceding subblock has been finished, which causes no trouble in performing the normal intra prediction. Note that simplified intra prediction and intra prediction will be described below in detail.

Difference data between each encoding target pixel and the prediction image (second prediction image), which has been obtained in the optimum prediction mode determined by the intra prediction unit 2, is supplied to the transform unit 3. Note that the transform unit 3 is configured such that the difference data obtained in an intra-frame mode for performing intra-frame prediction described above and the difference data obtained in an inter-frame mode for performing the inter-frame prediction are switched in accordance with a mode to be supplied thereto.

The transform unit 3 performs discrete cosine transform (DCT) on the supplied difference data to output a transform factor, and in H.264, there is used integer transform in which floating-point calculation is converted into an integer. Note that the transform is performed in 4 by 4 pixels.

The quantization unit 4 quantizes the DCT transform factor supplied from the transform unit 3, and outputs the quantized transform factor.

The quantized transform factor is supplied to the entropy coding unit 5. The entropy coding unit 5 uses exponential golomb coding and context-based adaptive variable length coding (CAVLC), to which exponential golomb coding is applied, for baseline profile and X profile and uses arithmetic code which is referred to as context-based adaptive binary arithmetic coding (CABAC) for main profile and high profile to perform entropy coding on the quantized transform factor, thereby outputting the compressed image data as a bit stream.

Note that the quantized transform factor is supplied also to the inverse quantization unit 6 and is converted back into the difference data further via the inverse transform unit 7.

In the inter-frame mode, a switch SW1 is turned on, whereby the difference data is individually added to a pixel value of an immediately preceding frame which is created by the inter-frame prediction unit 10, and is then stored in the frame memory 9 via the loop filter 8. The data of this frame is the same as the encoded image to be reproduced by a decoder, and is used as the immediately preceding frame in a case where the following frame is created.

On the other hand, in a case of the intra-frame mode, a switch SW2 is turned on, whereby the difference data after inverse transform is individually added to a pixel value of a prediction image obtained in the optimum prediction mode which has been determined by the intra prediction unit 2, and is supplied to the simplified intra prediction unit 1 and the intra prediction unit 2 as encoded image data to be used in simplified intra prediction and intra prediction. Note that this encoded image data is the same as the image data to be reproduced by the decoder.

Here, the processing for obtaining the same image data as the image data to be reproduced by the decoder through transform processing, quantization processing, inverse transform processing and inverse quantization processing by the transform unit 3, the quantization unit 4, the inverse quantization unit 6 and the inverse transform unit 7, respectively, is referred to as local decoding.

The loop filter 8 is a deblocking filter for smoothing only a block boundary in the integer transform to prevent generation of block noise.

The inter-frame prediction unit 10 uses the image data of the immediately preceding frame, which has been stored in the frame memory 9, to perform motion compensation for creating a prediction image of the following frame in consideration of motion on a screen. The prediction image created here is used for taking a difference with an input image in the inter-frame mode.

The motion prediction unit 11 performs motion prediction on a screen by detecting a motion vector from the input image signal, and supplies a result thereof to the entropy coding unit 5 and the inter-frame prediction unit 10.

(Operation of Simplified Intra Prediction Unit)

Next, description will be given of an operation of selecting an optimum prediction mode by the simplified intra prediction unit 1 with reference to flowcharts shown in FIG. 22 and FIG. 23.

Figure 22:
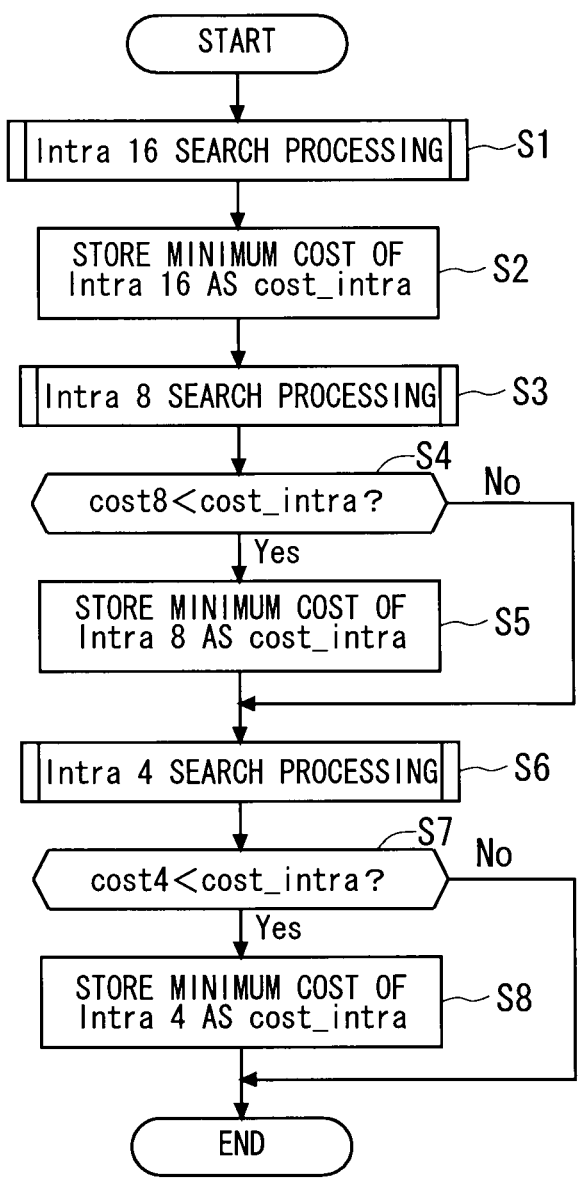
FIG. 22 is a flowchart showing an overall flow of an operation of selecting an optimum prediction mode.

FIG. 22 is the flowchart showing an overall flow of the operation of selecting an optimum prediction mode, which shows a case where the optimum prediction mode is selected from all prediction methods of Intra 16, Intra 8 and Intra 4.

Selecting operation is started, and in Step S1 shown in FIG. 22, search is performed as to Intra 16, to thereby obtain a prediction mode leading to a minimum cost. The search target modes in this case are all of the prediction modes 0 to 3 as described above. Note that a specific search operation will be described below with reference to FIG. 23.

Then, in Step S2, a minimum cost (first minimum cost) in Intra 16 is stored as cost_intra, and a prediction mode (first prediction mode) corresponding thereto is stored as well.

Next, in Step S3, search is performed as to Intra 8, to thereby obtain a prediction mode (second prediction mode) leading to a minimum cost (second minimum cost). As described above with reference to FIG. 20, the search target modes in this case are a plurality of prediction modes which have been limited in advance in association with the prediction mode leading to the minimum cost as a result of the search in Intra 16.

The search target modes are selected based on the prediction mode in Intra 16 leading to the minimum cost, which has been stored in Step S2, and in the example shown in FIG. 20, a maximum of five prediction modes is selected.

Next, in Step S4, a relationship of magnitude between the minimum cost in Intra 16, which has been stored as cost_intra, and the minimum cost (cost 8) in Intra 8 is judged. Then, the process proceeds to Step S5 in a case where it is determined that the cost 8 is smaller, and the minimum cost in Intra 8 is stored as cost_intra, and a corresponding prediction mode is stored as well.

On the other hand, in a case where it is judged that cost_intra (minimum cost in Intra 16) is smaller in Step S4, the process proceeds to Step S6.

In Step S6, search is performed as to Intra 4, to thereby obtain a prediction mode (second prediction mode) leading to a minimum cost (second minimum cost). As described above with reference to FIG. 20, the search target modes in this case are a plurality of prediction modes which have been limited in advance in association with the prediction mode (first prediction mode) leading to the minimum cost (first minimum cost) as a result of the search performed in Intra 8. The search target modes are selected based on the prediction mode in Intra 8 leading to the minimum cost, which has been stored in Step S5, and in the example shown in FIG. 20, three prediction modes are selected.

Next, in Step S7, a relationship of magnitude between cost_intra and a minimum cost (cost 4) in Intra 4 is judged. Then, the process proceeds to Step S8 in a case where it is determined that the cost 4 is smaller, and the minimum cost in Intra 4 is stored as cost_intra and a corresponding prediction mode is stored as well, thereby finishing a series of processings. In this case, the stored prediction mode is an optimum prediction mode obtained by simplified intra prediction.

Note that cost_intra which is a comparison target in Step S7 is the minimum cost in Intra 8 which has been stored in Step S5 or the minimum cost in Intra 16 which has been stored in Step S2.

On the other hand, in a case where it is judged that cost_intra (minimum cost in Intra 16 or minimum cost in Intra 8) is smaller in Step S7, a prediction mode corresponding to the cost_intra is an optimum prediction mode obtained by simplified intra prediction.

Figure 23:
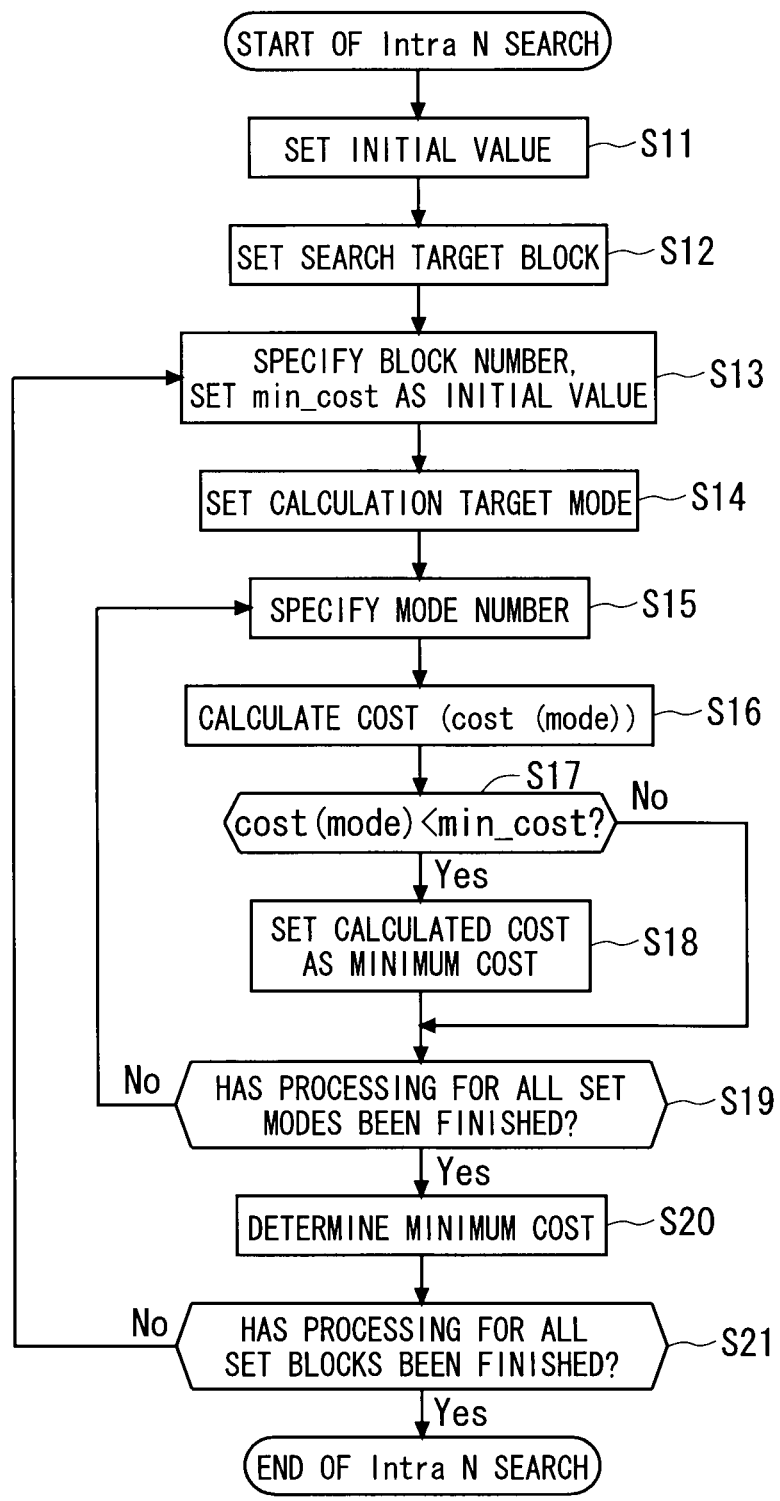
FIG. 23 is a flowchart for describing a search operation.

FIG. 23 is the flowchart for describing the search operations in Steps S1, S3 and S6 which have been described with reference to FIG. 22, in which any of search operations is not identified, and description will be given of a search operation in Intra N.

First, when search is started as to Intra N, in Step S11, a value of the stored cost is set to zero as an initial value. This is an operation of, in performing new search operation, resetting a value of the cost obtained by the former search operation because the search operation is repeated.

Next, in Step S12, a search target block is set. For example, there is no subblock in Intra 16 as shown in FIG. 17, and thus the search target block is only the number 0 block. In Intra 8, the search target blocks are the number 0 to 3 blocks because there are four subblocks as shown in FIG. 18, and in Intra 4, search target blocks are the number 0 to 15 blocks because there are sixteen subblocks as shown in FIG. 19.

Next, in Step S13, among the search target blocks which have been set in Step S12, a block number to be actually searched is specified. Further, a conceivable maximum value (COST_MAX) is set as an initial value of the minimum cost (min_cost) in MODE (N).

Next, in Step S14, a prediction mode (calculation target mode) which is a target of cost calculation is set. For example, the number 0 to 3 prediction modes are set in Intra 16 as shown in FIG. 20, a maximum of five patterns of prediction modes is set in Intra 8, and three patterns of prediction modes are set in Intra 4.

Next, in Step S15, a mode number where cost is actually calculated is specified among the calculation target modes set in Step S14.

Next, in Step S16, a prediction image is obtained based on the prediction mode of the specified mode number, and a difference between the pixel value prior to interpolation and a pixel value of the prediction image obtained by interpolation is calculated in 4 by 4 pixels, whereby a total sum (SAD) thereof is obtained to calculate a cost (cost (mode)). That is, the search target block consists of 4 by 4 pixels in Intra 4, and thus the SAD of 4 by 4 pixels of the search target block is the cost (cost (mode)) to be calculated in Step S16.

On the other hand, the search target block consists of 8 by 8 pixels in Intra 8, and thus the SAD is calculated for each of the subblocks obtained by segmenting 8 by 8 pixels of the search target block into four in 4 by 4 pixels. Then, the SADs of four subblocks are summed up, thereby obtaining the resultant thereof as the cost (cost (mode)) to be calculated in Step S16.

Further, the search target block consists of 16 by 16 pixels in Intra 16, and thus the SAD is calculated for each of the subblocks obtained by segmenting 16 by 16 pixels of the search target block into sixteen in 4 by 4 pixels. Then, the SADs of sixteen subblocks are summed up, thereby obtaining the resultant thereof as the cost (cost (mode)) to be calculated in Step S16.

Next, in Step S17, the relationship of magnitude between the cost (cost (mode)) calculated in Step S16 and the minimum cost (min_cost) is judged. Note that in a case where min_cost is set as the initial value (COST_MAX), it is assumed that cost (mode) is smaller.

Then, in a case where it is judged that cost (mode) is smaller, the process proceeds to Step S18, and the calculated cost (cost (mode)) is set as the minimum cost (min_cost).

After that, in Step S19, it is judged whether or not cost calculation has been finished for all calculation target modes set in Step S14. In a case where there is the calculation target mode whose cost has not been calculated, the process returns to Step S15 to specify a mode number where cost is calculated next, and then the operation of Step S16 and the following operations are repeated.

On the other hand, in a case where it is judged that there is no calculation target mode in Step S19, in Step S20, the minimum cost (min_cost) set in Step S18 is temporarily determined as the minimum cost in Intra N.

After that, in Step S21, it is judged whether or not the minimum cost has been determined as to all search target blocks set in Step S12. In a case where there is the search target block whose minimum cost has not been determined, the process returns to Step S13 to specify a block number where the minimum cost is determined next, and then the operation of Step S14 and the following operations are repeated.

On the other hand, in a case where it is judged that there is no search target block in which the minimum cost has not been determined in Step S21, the resultant obtained by adding up the minimum costs of temporal encoding size which have been determined in Step S20 by the number of macroblocks is determined as the minimum cost in Intra N, thereby finishing the search operation.

In the simplified intra prediction unit 1, narrowing down of a prediction mode in the above-mentioned processing is performed by simplified intra prediction in which not only an encoded pixel value but also a pixel value prior to encoding (pixel value in a state of not being encoded) is also used as a prediction value.

The optimum prediction mode obtained by the simplified intra prediction unit 1 is supplied to the intra prediction unit 2, and the intra prediction unit 2 performs normal intra prediction.

(Simplified Intra Prediction and Intra Prediction)

Next, simplified intra prediction and intra prediction will be described.

Figure 24:
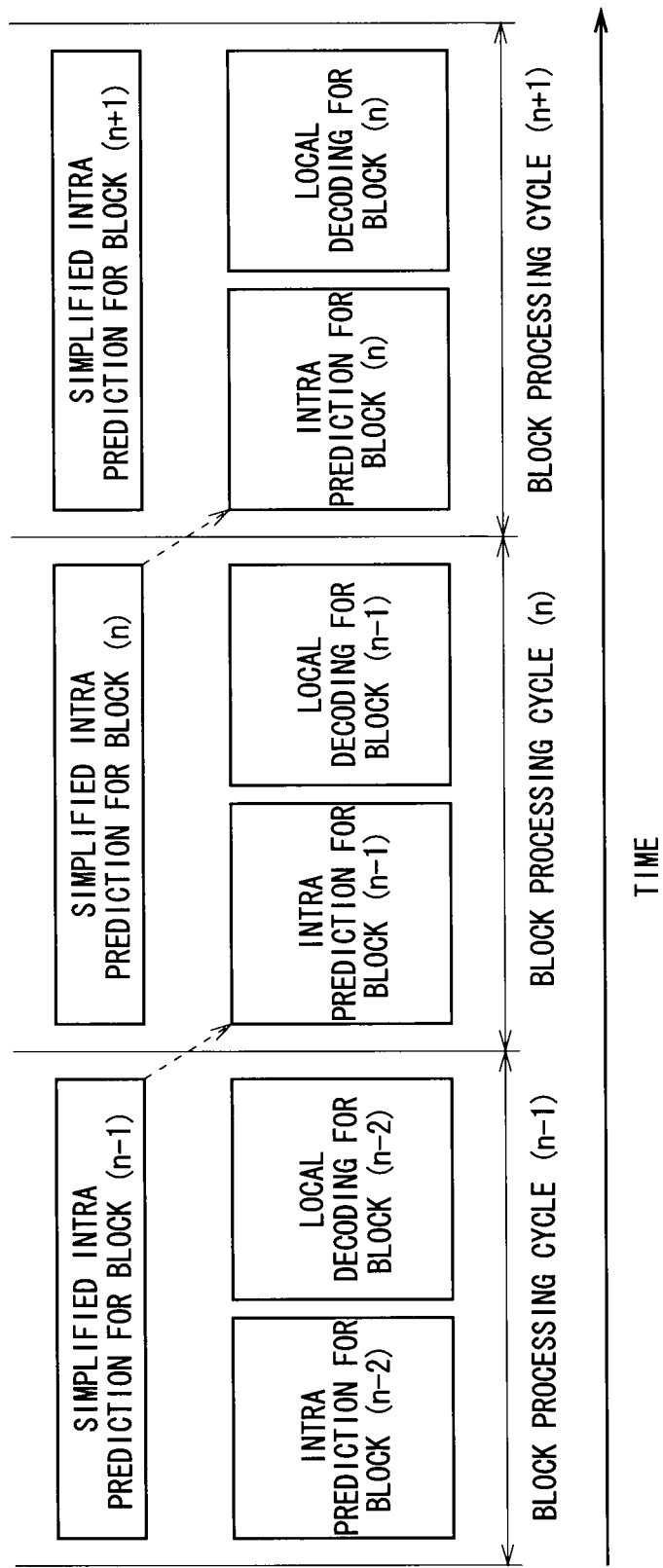
FIG. 24 schematically shows a pipeline processing.

The simplified intra prediction and intra prediction are performed by a pipeline processing. FIG. 24 schematically shows the pipeline processing.

In FIG. 24, a horizontal axis represents a lapse of time, and a series of processing cycle is represented as a block processing cycle. FIG. 24 shows three block processing cycles (n−1), (n) and (n+1).

Here, assuming that the number 0 subblock is a subblock to be encoded, by the simplified intra prediction unit 1, an optimum prediction mode is selected for a number n subblock among all prediction methods of Intra 16, Intra 8 and Intra 4 through the processings described with reference to FIG. 22 and FIG. 23.

In simplified intra prediction, a pixel value of an input image signal is used as a prediction value in a case where encoding of a subblock to be referred to has not been finished.

For example, in a case where the number 13 subblock SB is assumed to be the number n subblock, in normal intra prediction, nine patterns of prediction modes cannot be all performed before encoding of the number 12 subblock SB is finished. However, in simplified intra prediction, nine patterns of prediction modes can be all performed by using a pixel of the number 12 subblock SB which has not been encoded, that is, a pixel value of an encoding target pixel.

As shown in FIG. 24, simplified intra prediction for the number 0 subblock is performed in the block processing cycle (n). However, in order to obtain an optimum prediction mode among all prediction methods of Intra 16, Intra 8 and Intra 4, cost calculation needs to be performed 72 times in the example described with the equation (2), in which simplified intra prediction is performed using almost entire period of the block processing cycle (n).

In addition, in the block processing cycle (n), normal intra prediction is performed by the intra prediction unit 2 on the number n−1 subblock in parallel with simplified intra prediction.

As to the number n−1 subblock, the simplified intra prediction is performed in the block processing cycle (n−1)

to narrow down a prediction mode, and encoding based on the optimum prediction mode can be performed within a period of the processing cycle thus if a result of the narrowing down is reflected to perform normal intra prediction in the block processing cycle (n).

That is, in the intra prediction performed here, it is only required to perform prediction again on the optimum prediction mode obtained in the simplified intra prediction, whereby intra prediction can be performed on the optimum prediction mode in a shorter period of time compared with the simplified intra prediction. In addition, in the intra prediction performed here, reference target pixels are all encoded, whereby it is possible to perform prediction with high accuracy.

Note that in the block processing cycle (n−1), local decoding of the number n−2 subblock has been finished, which causes no trouble in performing the normal intra prediction.

Normal intra prediction is performed on the number n−1 subblock to determine a prediction image in an optimum prediction mode, and then the prediction image is used in the block processing cycle (n), to thereby perform local decoding on the number n−1 subblock.

Pixel data of the number n−1 subblock which has been encoded through local decoding is stored in a memory within the intra prediction unit 2, which is used in normal intra prediction for the number n subblock.

In the same manner, in the block processing cycle (n+1), simplified intra prediction is performed on the number n+1 subblock, and at the same time, normal intra prediction is performed on the number n subblock to determine a prediction image. After that, difference data obtained from the prediction image is used to perform local decoding on the number n subblock.

Figure 25:
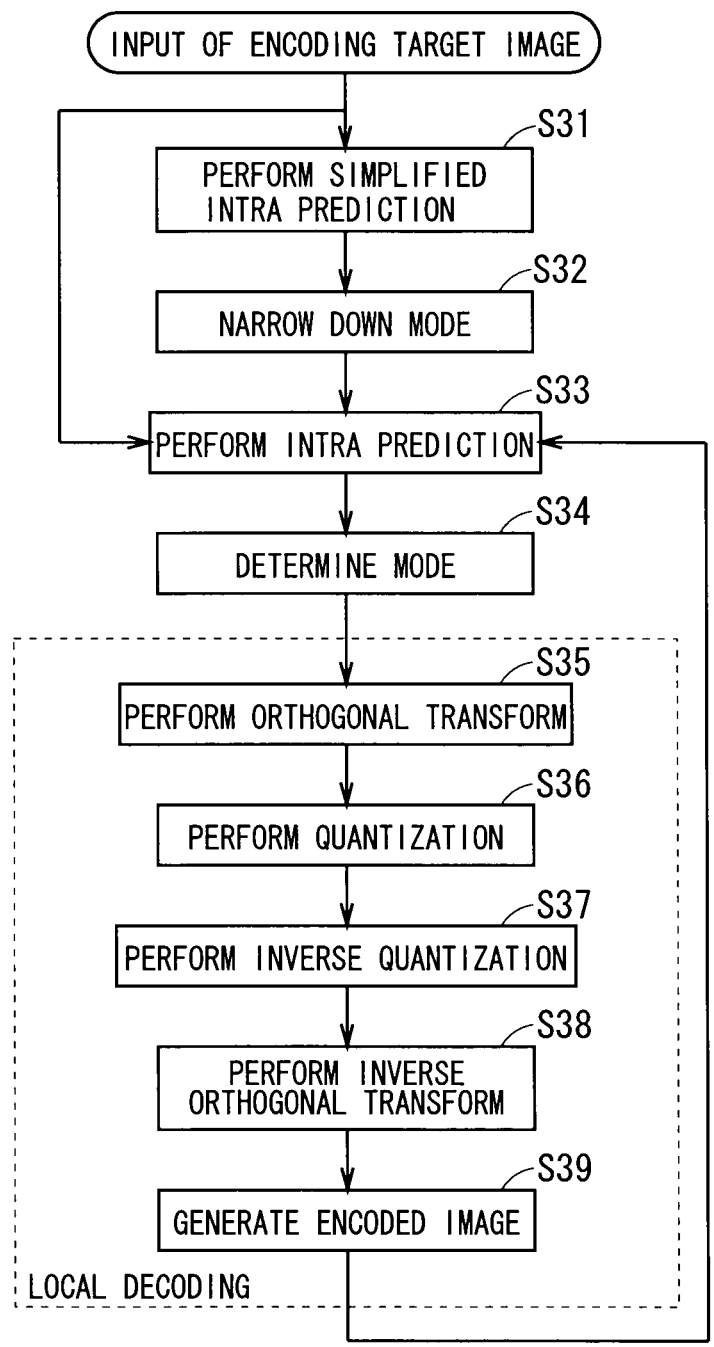
FIG. 25 is a flowchart for describing a method of generating image data including simplified intra prediction.

FIG. 25 is a flowchart showing a flow of simplified intra prediction, normal intra prediction and local decoding which are performed on the encoding target subblock.

In FIG. 25, data of the encoding target image is input to the encoder 100, and then the simplified intra prediction unit 1 performs simplified intra prediction in Intra 16, Intra 8 and Intra 4 to obtain a prediction image (Step S31). Then, an optimum prediction mode is narrowed down following the procedure described with reference to FIG. 22 and FIG. 23 (Step S32). Note that the data of the encoding target pixel is supplied to the intra prediction unit 2 as well.

Then, the intra prediction unit 2 performs intra prediction, using the encoded pixel value, on the optimum prediction mode which has been narrowed down in Step S32 (Step S33), to thereby obtain a prediction image (Step S34).

After that, the transform unit 3 performs orthogonal transform (for example, DCT) on the difference data between the obtained prediction image and the original pixel value of each encoding target pixel (Step S35), and then the quantization unit 4 performs quantization (Step S36). After that, the inverse quantization unit 6 performs inverse quantization (Step S37), and the inverse transform unit 7 performs inverse transform (Step S38).

Then, data (difference data) subjected to inverse transform is added to the prediction image obtained in the optimum prediction mode to generate encoded image data (Step S39), which is fed back to the intra prediction unit 2.

(Effects)

As described above, in the encoder 100, the simplified intra prediction unit 1 which performs intra prediction also using a pixel value prior to encoding as a prediction value performs cost calculation as to the prediction methods of Intra 16, Intra 8 and Intra 4 in order from the prediction method of a larger encoding size, and based on the result thereof, selects a prediction mode in the following prediction method. Accordingly, the number of times cost calculation is performed is significantly reduced in deriving an optimum prediction mode. In addition, this is performed by the simplified intra prediction unit 1, and thus image prediction may be started at a stage at which encoding of the immediately preceding subblock has not been finished. As a result, time required for intra prediction is reduced, which makes intra prediction more efficient.

(First Modification)

In the operation of selecting the optimum prediction mode in the encoder 100 described with reference to FIG. 22, there is described the case where cost calculation is performed as to the prediction methods of Intra 16, Intra 8 and Intra 4 in order from the prediction method of a larger encoding size. However, in a case where a cost for a larger encoding size is smaller than a cost for a smaller encoding size, the configuration may be made to skip the following processings. This operation will be described with reference to a flowchart shown in FIG. 26. Note that in FIG. 26, steps showing the same operations as those of FIG. 22 are denoted by the same reference symbols, and overlapping description will be omitted.

Figure 26:
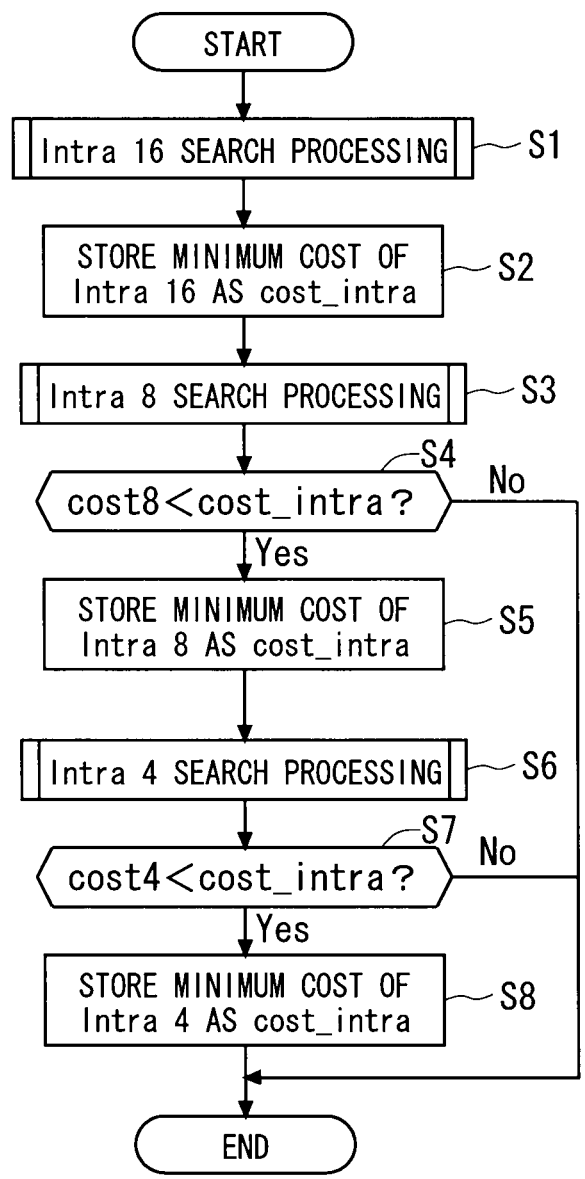
FIG. 26 is a flowchart for describing a modification of the operation of selecting the optimum prediction mode.

In Step S4 shown in FIG. 26, a relationship of magnitude between the minimum cost (first minimum cost) in Intra 16 which has been stored as cost_intra and the minimum cost (second minimum cost: cost 8) in Intra 8 is judged. Then, in a case where it is judged that the cost 8 is smaller, the process proceeds to Step S5 to store the minimum cost in Intra 8 as cost_intra and store a corresponding prediction mode as well.

On the other hand, in a case where it is judged that cost_intra (minimum cost in Intra 16) is smaller in Step S4, the succeeding processings are skipped, thereby finishing a series of processes. In this case, the minimum cost in Intra 16 which has been stored as cost_intra is the optimum prediction mode obtained by simplified intra prediction.

The above-mentioned skip is performed because, in a case where cost is not reduced even in an encoding size (8 by 8) of Intra 8 which is smaller than an encoding size (16 by 16) of Intra 16, a cost is highly unlikely to be reduced in an encoding size (4 by 4) much smaller than the encoding size (8 by 8), which results in unnecessary cost calculation if the minimum cost in Intra 4 is obtained even in such a case. In particular, though cost calculation needs to be performed 48 times for calculating the minimum cost in Intra 4 in the case of FIG. 20, the number of times cost calculation is performed is reduced to a third thereof if this is omitted.

(Second Modification)

In the example of the prediction mode being a target of cost calculation for each search result, which is shown in FIG. 20, there is a maximum of five patterns of prediction modes in MODE (8) for the search results in Intra 16, and there are three patterns of search target modes in MODE (4) for the search results in Intra 8, which are not limited thereto. For example, it is possible to make the prediction mode and the search target mode variable frame by frame in accordance with an image size or the degree of difficulty in encoding.

That is, the search target mode is set by a register, which is capable of being changed appropriately through a change of register setting.

For example, in a case where the encoder 100 shown in FIG. 21 has capability of performing 30 fps (frame per second) encoding on a high definition (HD) image of 1,920×1,088, the encoder 100 is capable of performing intra prediction 72 (time/MB)×8,160 (MB)=587,520 (time/frame).

Here, in a case of performing 30 fps encoding on an HD image of 1,440×1,088, 1,440×1,088=6,120 MB. Therefore, in a case where the search target mode in MODE (8) is changed to full search (9 modes), the required number of times cost calculation is performed for selecting an optimum prediction mode is 88 times which is expressed by the following equation (3).

$$\frac{1(\text{block}) \times 4(\text{mode})}{(\text{Intra } 16)} + \frac{4(\text{block}) \times 9(\text{mode})}{(\text{Intra } 8)} + \frac{16(\text{block}) \times 3(\text{mode})}{(\text{Intra } 4)} = 88\Lambda \quad (3)$$

In this case, intra prediction is performed 88 (time/MB)× 6,120 (MB)=538,560 (time/frame), which is a numerical value within a performance range of the encoder 100. This enables the processing in real time.

Further, in a case where 30 fps encoding is performed on a standard density (SD) image of 704×480, 704×480=1,320 MB. Therefore, in a case where the search target modes in MODE (8) and MODE (16) are each changed to full search, the required number of times cost calculation is performed for selecting an optimum prediction mode is 164 times which is expressed by the following equation (4).

$$\frac{1(\text{block}) \times 4(\text{mode})}{(\text{Intra } 16)} = \frac{4(\text{block}) \times 9(\text{mode})}{(\text{Intra } 8)} + \frac{16(\text{block}) \times 9(\text{mode})}{(\text{Intra } 4)} \quad (4)$$
$$= 184\Lambda$$

In this case, intra prediction is performed 184 (time/MB)× 1,320 (MB)=242,880 (time/frame), which is a numerical value within the performance range of the encoder 100. This enables the processing in real time.

(Third Modification)

Intra prediction is also performed as to a color difference signal, and in the intra prediction (Intra chroma) of a color difference signal, a prediction processing similar to that of a luminance component in Intra 16 is performed. Therefore, it is conceivable that a prediction result of Intra chroma will be closely similar to that of Intra 16.

That is, there are four patterns of prediction modes as in Intra 16, and prediction directions are the same as well. Therefore, under the present circumstance where encoding processing time for one frame has been increased to make real time processing difficult, it is possible to reduce processing time without decreasing image quality to maintain real time processing by determining an encoding mode of Intra chroma using the search result in Intra 16.

That is, visual characteristics of a man are more sensitive to image degradation due to a luminance compared with a color difference. Therefore, it is aimed to balance between image quality and real time processing by omitting search in a color difference mode not in a luminance mode.

FIG. 27 shows an example of an encoding mode in Intra chroma which is associated with the search result in Intra 16.

In FIG. 27, in a case where it is revealed that the prediction mode 0 leads to the minimum cost as a result of the search in Intra 16, the encoding mode in Intra chroma is determined 2 (which is the same vertical direction as the prediction mode 0). Similarly, the encoding mode in Intra chroma is determined 1 (which is the same horizontal direction as the prediction mode 1) in a case where the search result in Intra 16 is the prediction mode 1, the encoding mode in Intra chroma is determined 0 (the same DC as the prediction mode 2) in a case where the search result in Intra 16 is the prediction mode 2, and the encoding mode in Intra chroma is determined 3 (the same plane prediction as the prediction mode 3) in a case where the search result in Intra 16 is the prediction mode 3.

The processing time is reduced by performing Intra chroma by the above-mentioned method, and thus it is effective to use an amount of reduced time in Intra 16, Intra 8 and Intra 4 (increase the number of prediction modes).

Further, it is effective to make the number of search target mode in Intra chroma variable frame by frame in accordance with an image size or the degree of difficulty in encoding in terms of improving a relationship between the image quality corresponding to use and a processing amount.

Second Preferred Embodiment

Overall Configuration of Encoder and Flow of Operation

Next, as a second preferred embodiment of the present invention, description will be given of a case where the present invention is applied to an H.264 encoder which generates a prediction image only by intra prediction without using simplified intra prediction.

FIG. 28 is a block diagram showing a configuration of an H.264 encoder 200 which creates a prediction image through intra prediction. Note that the same components as those of the encoder 100 shown in FIG. 21 are denoted by the same reference numerals, and overlapping description will be omitted.

As shown in FIG. 28, the encoder 200 includes an intra prediction unit 22, the transform unit 3, the quantization unit 4, the entropy coding unit 5, the inverse quantization unit 6, the inverse transform unit 7, the loop filter 8, the frame memory 9, the inter-frame prediction unit 10 and the motion prediction unit 11.

An input image signal input to the encoder 200 is supplied to the intra prediction unit 22 and the motion prediction unit 11, and is also used for taking a difference with a prediction image output from the inter-frame prediction unit 10.

The intra prediction unit 22 selects, among all prediction methods of Intra 16, Intra 8 and Intra 4, an optimum prediction mode by intra prediction. In intra prediction, the encoded pixel value of the subblock (first subblock) to be referred to is used to perform a maximum of nine patterns of prediction modes, whereby a prediction image (first prediction image) in each prediction mode is obtained. At the same time, the SAD of the differences with the pixel value of the encoding target pixel of the subblock (second subblock) to be encoded, that is, a cost is obtained.

In this case, in accordance with the technical idea of the present invention which has been previously described, cost calculation is performed in order from the prediction method whose encoding size is larger, and a prediction mode in the following prediction method is selected based on a result thereof, whereby the prediction mode is narrowed down to select an optimum prediction mode.

In the intra-frame mode, the difference data between each encoding target pixel and the prediction image (second prediction image), which is obtained in the optimum prediction mode determined by the intra prediction unit 22, is supplied to the transform unit 3, and then is converted back into the difference data via the quantization unit 4, the entropy coding unit 5, the inverse quantization unit 6 and the inverse transform unit 7.

In the inter-frame mode, a switch SW3 is turned on, whereby the difference data is individually added to a pixel value of a immediately preceding frame which has been created by the inter-frame prediction unit 10, and then is stored in the frame memory 9 via the loop filter 8. The data of this frame is the same as the encoded image to be reproduced by the decoder, and is used as the immediately preceding frame in a case where the following frame is created.

The inter-frame prediction unit 10 uses the image data of the immediately preceding frame, which has been stored in the frame memory 9, to perform motion compensation for creating a prediction image of the following frame in consideration of motion on a screen. The prediction image created here is used for taking a difference with an input image in the inter-frame mode.

The motion prediction unit 11 performs motion prediction on a screen by detecting a motion vector from the input image signal, and supplies a result thereof to the entropy coding unit 5 and the inter-frame prediction unit 10.

(Effects)

As described above, in the encoder 200, the intra prediction unit 22 performs the operation of selecting an optimum prediction mode by the method described with reference to the flowcharts shown in FIG. 22 and FIG. 23. The cost calculation is performed, as to the prediction methods of Intra 16, Intra 8 and Intra 4, in order from the prediction method of a larger encoding size, and the prediction mode in the following prediction method is performed based on the result thereof. Accordingly, it is possible to significantly reduce the number of times cost calculation is performed in deriving an optimum prediction mode.

While the invention has been shown and described in detail, the foregoing description is in all aspects illustrative and not restrictive. It is therefore understood that numerous modifications and variations can be devised without departing from the scope of the invention.

What is claimed is:

1. A method of generating image data for performing image prediction subblock by subblock, the subblock being obtained by segmenting a macroblock in a predetermined encoding size, said image prediction being performed by a plurality of prediction methods defined by a size of said subblock, the method comprising:
a first step of performing interpolation on a pixel of a second subblock serving as an encoding target in a plurality of prediction modes, using a pixel value of a first subblock serving as a reference target; and
a second step of obtaining a cost defined by a sum of absolute difference between a pixel value of a first prediction image of said second subblock obtained by said interpolation and a pixel value of said second subblock prior to execution of interpolation, for each of said plurality of prediction modes, to thereby determine a minimum cost among said obtained costs, wherein
said first and second steps are performed in a prediction method in which said encoding size is larger to obtain a first prediction mode leading to a first minimum cost,
said first and second steps are performed in a following prediction method to determine a second minimum cost using a prediction mode set in advance for said first prediction mode, and
said first and second minimum costs are compared with each other to determine an optimum prediction mode through an operation of selecting the smaller minimum cost.

2. The method of generating image data according to claim 1, wherein in a case where said first minimum cost is judged to be smaller in the comparison between said first and second minimum costs, an operation of calculating a minimum cost in the prediction method in which said encoding size is smaller is skipped to determine said first prediction mode leading to said first minimum cost as said optimum prediction mode.

3. The method of generating image data according to claim 1, wherein:
said macroblock consists of 16 by 16 pixels; and
in said plurality of prediction methods, the image prediction of said macroblock is performed in subblocks of 16 by 16 pixels, 8 by 8 pixels, and 4 by 4 pixels.

4. The method of generating image data according to claim 1, wherein:
said first subblock is a subblock whose encoding is yet to be finished;
said image prediction corresponds to simplified intra prediction for performing interpolation on the pixel of said second subblock using the pixel value of said first subblock prior to encoding; and
the optimum prediction mode determined in said simplified intra prediction is used to perform intra prediction.

5. The method of generating image data according to claim 4, wherein:
said simplified intra prediction and said intra prediction are performed by a pipeline processing; and
said pipeline processing includes, in a number n processing cycle in which said simplified intra prediction is performed on a number n subblock, executing said intra prediction on a number n−1 subblock subjected to said simplified intra prediction in a number n−1 processing cycle, and executing local decoding on said number n−1 subblock using said optimum prediction mode determined by said simplified intra prediction.

6. The method of generating image data according to claim 1, wherein:
said first subblock is an encoded subblock; and
said image prediction corresponds to intra prediction for performing interpolation on the pixel of said second subblock using a pixel value of said encoded subblock.

* * * * *